United States Patent
Chu et al.

(10) Patent No.: US 8,010,817 B2
(45) Date of Patent: Aug. 30, 2011

(54) MULTI-PROCESSOR SYSTEM AND PERFORMANCE ADJUSTMENT METHOD THEREOF

(75) Inventors: Shao-Kang Chu, Taipei (TW); Yi-Wei Chiu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 636 days.

(21) Appl. No.: 12/003,692

(22) Filed: Dec. 31, 2007

(65) Prior Publication Data

US 2008/0172565 A1 Jul. 17, 2008

(30) Foreign Application Priority Data

Jan. 12, 2007 (TW) .............................. 96101332 A

(51) Int. Cl.
*G06F 1/00* (2006.01)
(52) U.S. Cl. ....................................................... 713/323
(58) Field of Classification Search .......... 713/300–340; 323/282; 363/69
See application file for complete search history.

(56) References Cited

U.S. PATENT DOCUMENTS

| | | | |
|---|---|---|---|
| 5,053,950 A * | 10/1991 | Naganuma et al. ........... | 718/105 |
| 6,191,499 B1 | 2/2001 | Severson et al. | |
| 6,263,386 B1 | 7/2001 | Sanders | |
| 6,574,739 B1 * | 6/2003 | Kung et al. .................... | 713/322 |
| 6,654,264 B2 * | 11/2003 | Rose ................................ | 363/65 |
| 6,745,335 B1 | 6/2004 | Kusano | |
| 6,792,553 B2 | 9/2004 | Mar et al. | |
| 6,804,790 B2 | 10/2004 | Rhee et al. | |
| 6,990,594 B2 * | 1/2006 | Kim .............................. | 713/322 |
| 7,076,671 B2 | 7/2006 | Espinoza-Ibarra et al. | |
| 7,085,943 B2 * | 8/2006 | Chun et al. .................... | 713/300 |
| 7,134,031 B2 | 11/2006 | Flautner | |
| 7,337,335 B2 * | 2/2008 | Jorgenson et al. ............ | 713/300 |
| 7,401,243 B2 * | 7/2008 | Knepper et al. .............. | 713/322 |
| 7,430,672 B2 * | 9/2008 | Rotem et al. .................. | 713/300 |
| 7,490,328 B2 * | 2/2009 | Gavish et al. ................. | 718/105 |
| 7,694,158 B2 * | 4/2010 | Melpignano et al. ......... | 713/300 |
| 7,925,906 B2 * | 4/2011 | Ranganathan et al. ....... | 713/320 |
| 2005/0046400 A1 | 3/2005 | Rotem | |
| 2005/0228967 A1 | 10/2005 | Hirairi | |

FOREIGN PATENT DOCUMENTS

| | | |
|---|---|---|
| DE | 102009029329 A1 * | 5/2010 |
| JP | 08-190535 A | 7/1996 |
| TW | 274283 B | 4/2006 |

* cited by examiner

*Primary Examiner* — Paul R Myers

(57) ABSTRACT

A multi-processor system and a performance adjustment method thereof are disclosed. The multi-processor system includes a first processing unit and a second processing unit, the performance adjustment method includes: first, detecting the load of each processing unit to obtain corresponding detected data; then, determining whether one of the processing units has the most load; finally, if the first processing unit has the most load, increasing the power supply to the first processing unit.

16 Claims, 3 Drawing Sheets ical diagram of
MULTI-PROCESSOR SYSTEM AND PERFORMANCE ADJUSTMENT METHOD THEREOF This application claims the benefit of Taiwan application Serial No. 96101332, filed Jan. 12, 2007, the subject matter of which is incorporated herein by reference.

BACKGROUND OF THE INVENTION

1. Field of the Invention

The invention relates to a multi-processor system and, more particularly, to a performance adjustment method of the multi-processor system.

2. Description of the Related Art

Please refer to FIG. 1, which shows a schematic diagram of a conventional multiprocessor system. The multi-processor system 100 is provided normally on a motherboard of a computer system. The multi-processor system usually includes two or more Central Process Units (CPUs), such as a first processing unit and a second processing unit, and a first Voltage Regulator Module (VRM) VR1 and a second VRM VR2 which supply power corresponding to the processing units 110 and 120.

The state-of-the-art VRM can adjust the output voltage according to the core voltage level of the processing unit. For example, the first VRM VR1 produces a corresponding voltage Vcore1 to the first processing unit 110 according to a dynamic Voltage Identification Code (VID) provided by the first processing unit 110. Therefore, the first processing unit 110 can obtain the appropriate power supply from the first VRM VR1 under different CPU usage, so that the process efficiency is increased and the unnecessary waste of the power is avoided. Similarly, the second VRM VR2 supplies the power to the second processing unit 120 independently.

Moreover, a processor working in a plurality of work mode is also developed, which can switch among the C0-Active mode, C1-Halt mode, C2-Stop Clock mode, C3-Deep Sleep mode, C4-Deeper Sleep mode for automatically changing the core clock and the operation voltage of the processor according to the system load. Moreover, many desktops and laptop computers employ the Enhanced Intel Speed-Step Technology (EIST) to improve the system from the problems of high temperature and high power consumption. Some other efficiency-adjusting technologies of the CPU such as the CPU throttling are also developed.

It is well known that there are few corresponding supporting software programs under the current hardware level of the dual CPU or multi-core processor. For example, the game developer still writes the game program with a single thread due to the difficulty of the program development. This results in that the multi-processor system 100 only use one processing unit (such as the first processing unit 110) to execute the computer game program and let the second processing unit 120 to be idle. Sometimes since no optimization is considered for multi-processor system during programming and compiling, even the processing unit 110, 120 is distributed with balanced operation data, the data are still relevant and not independent completely. Under this situation, the second processing unit 120 may need to wait for the data from the first processing unit 110 to begin its operation. That is, the processing units 110, 120 can not give play their full operation ability at the same time. Although the processing units 110 and 120 provides double operation capability of single processor in theory, the increasing of the system efficiency is still limited when the operation bottleneck occurs, and the expected advantages are shielded.

BRIEF SUMMARY OF THE INVENTION

The objective of the invention is to provide a multi-processor system and a performance enhancement method thereof for avoiding bottleneck in operation when load of the multi-processor concentrates and improving the system throughput.

According to the objective of the invention, a performance enhancement method of the multi-processor system is provided. The multi-processor system includes a first processing unit and a second processing unit. The performance enhancement method includes the following steps: (a) detecting load of the processing units, and get a plurality of corresponding detect results; (b) determining whether the load concentrate on one of the processing units according to the detect results; and (c) if the load concentrate on the first processing unit, increasing the supply power of the first processing unit or enhancing the operation capability at the same time.

In one embodiment of the invention, the step (c) further includes increasing the clock or internal clock multiplier.

In one embodiment of the invention, the multi-processor system further includes a control unit and a clock generator. The control unit electrically connects to the processing units and the clock generator respectively, and the clock generator electrically connects to the processing units. The control unit increases the clock of the first processing unit by controlling the clock generator.

In one embodiment of the invention, the control unit controls the clock generator via an Inter-integrated circuit (I²C) bus for increasing the clock of the first processing unit.

In one embodiment of the invention, the step (c) further includes reducing the supply power, clock, internal clock multiplier, or power state of the second processing unit.

In one embodiment of the invention, in the step (c), the detecting of the load of the processing units is done by hardware means or software means.

According to the objective of the invention, a multi-processor system is provided, which includes a plurality of processing units, a clock generator, a power supply apparatus, a plurality of switch units, and a control unit. The clock generator connects to the processing units and supplies clocks to the processing units respectively. The power supply apparatus provides power for each processing units, and the switch units electrically connect between the power supply apparatus and the processing units respectively. The control unit electrically connects to the processing units, the clock generator, and the switch units, so that the control unit can adjusts the power from the power supply apparatus to the processing units by controlling the switch units and adjusts the clocks (working frequencies) provided to the processing units by controlling the clock generator and the internal clock multiplier.

In one embodiment of the invention, the control unit detects the load of the processing units by hardware or software monitor means to obtain a plurality of corresponding results.

In one embodiment of the invention, a detecting unit performs the hardware monitor means, and the detecting unit electrically connects to the processing units and the control unit.

In one embodiment of the invention, the control unit determines whether the load concentrate on one of the processing units according to the detecting results. If the load concentrated on the first processing unit, the control unit increases the supply power of the first processing unit by controlling the operation of the switch units. The control unit also can control the clock generator via the I²C Bus to increase the clock of the first processing unit. Furthermore, the control unit can increase the internal clock multiplier of the first processing unit.

In one embodiment of the invention, the switch units are transistor switches.

In one embodiment of the invention, the software monitor means reads the utility rate of the processing units by application programs or an operation system.

These and other features, aspects, and advantages of the present invention will become better understood with regard to the following description, appended claims, and accompanying drawings.

DETAILED DESCRIPTION OF THE EMBODIMENTS

Figure 1:
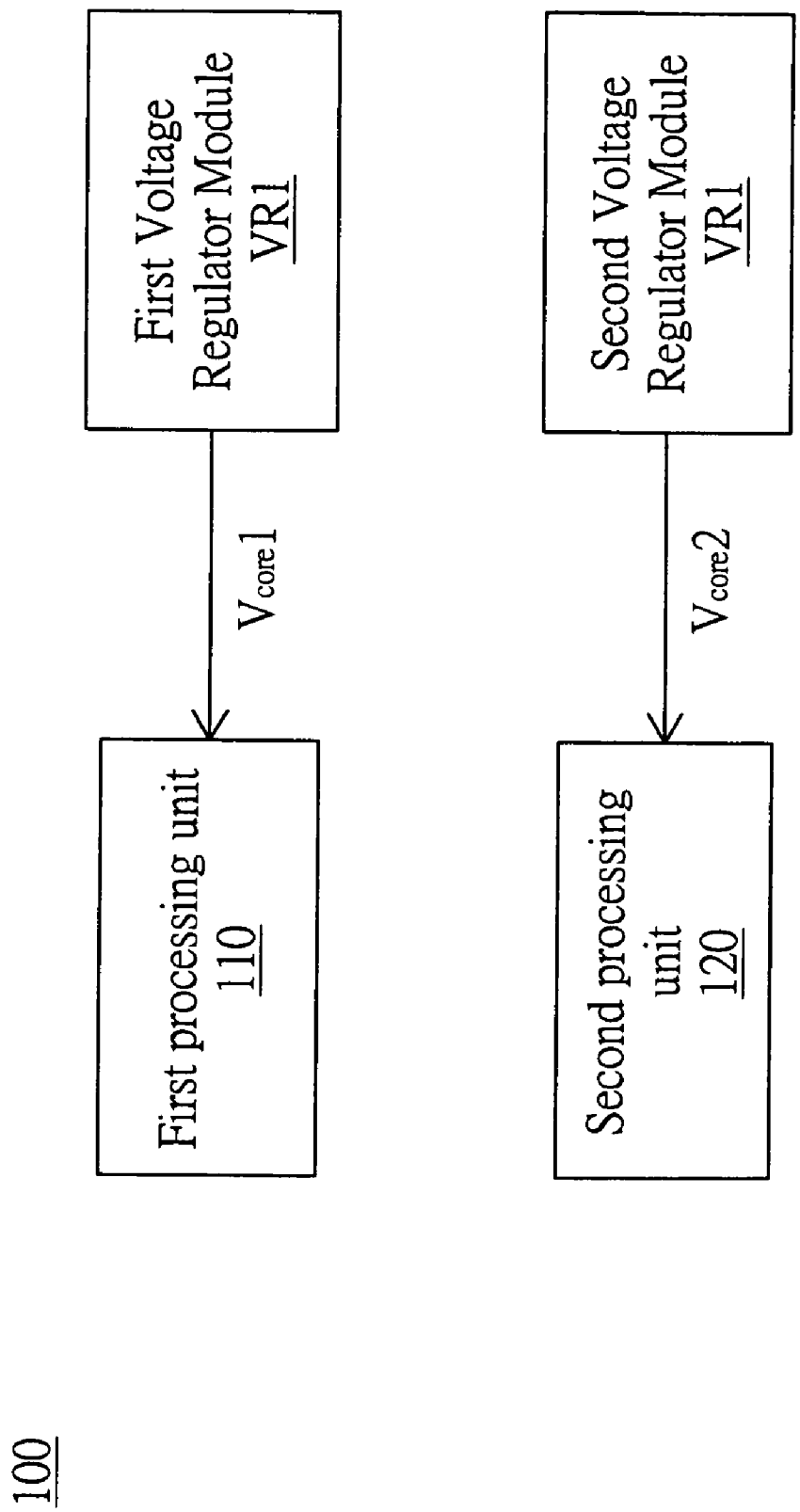
FIG. 1 shows the schematic diagram of a conventional multi-processor system.

Refer to FIG. 1, when the load concentrates on the first processing unit 110, the second processing unit 120 may be idled or be in a stand-by mode temporarily to wait for the operate result from the first processing unit. Similarly, when the load concentrates on the second processing unit 120, the first processing unit 110 does not contribute to reduce the processing time. Since few program designs support the multi-processor system, the whole capacity of the multi-processor system 100 is limited to the individual performance of the processing units 110 and 120. Therefore, enhancing the performance of each processing unit without change the software design may be a solution.

Take the first processing unit 110 for example. The operation capability of the first processing unit 110 can be increased to increase the operational capability, but more power than the normal rated power of original processor must be consumed so the developed first processing unit 110 can operate in higher speed. However, if the power supplied by the corresponding first VRM VR1 is not enough, the first processing unit 110 cannot operate in higher speed even collocated with various efficiency development technologies mentioned above. The multi-processor system of the embodiment of the invention can dynamically distribute the supply power to each processing unit to ensure the processing unit with high load can execute the operation in higher speed and reduce the bottleneck time for operation. Meanwhile, there is no need to reserve extra power supply for possible CPU updating in the future in designing the VRM.

Figure 2:
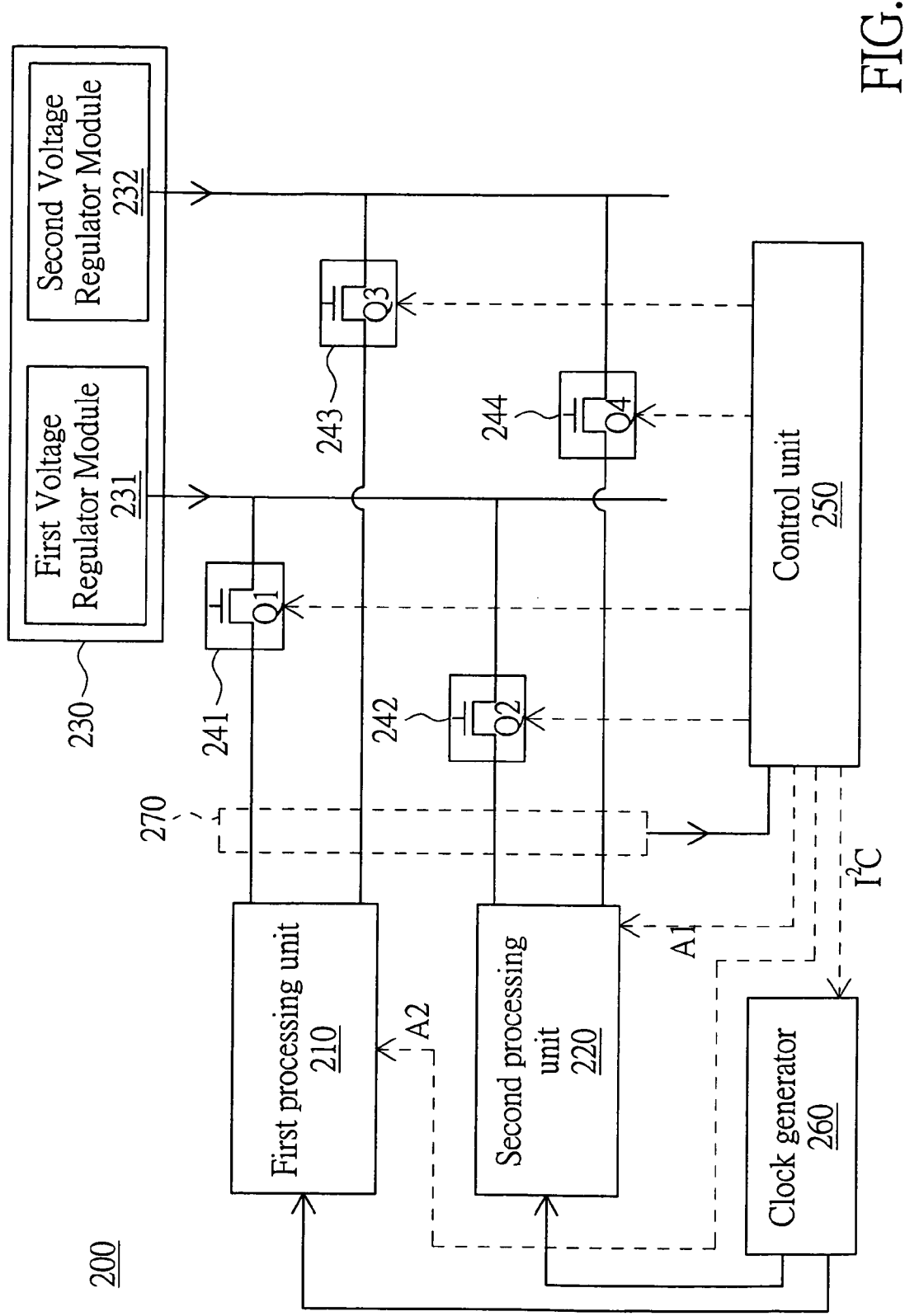
FIG. 2 is a schematic diagram showing a multi-processor system according to a preferable embodiment of the invention.

Please refer to FIG. 2, which shows the schematic diagram of the multi-processor system of the embodiment of the invention. The multi-processor system 200 includes a first processing unit 210, a second processing unit 220, a power supply apparatus 230, a plurality of switches 241, 242, 243, 244, a control unit 250, a clock generator 260, and a detecting unit 270. In the embodiment, the processing units 210, 220 are CPU. In some other embodiments, the detecting unit 270 can be implemented by software.

The clock generator 260 electrically connected to the processing units 210, 220 respectively, and the clock generator 260 also provides clocks (or called external clock) to the processing units 210, 220.

The power supply apparatus 230 supplies power to the processing units 210, 220. In the embodiment, the power supply apparatus 230 includes a first VRM 231 and a second VRM 232, wherein the first VRM 231 and the second VRM 232 respectively provide the power to the processing units 210, 220. At the initial setting, the power supply apparatus 230 configuration is similar to FIG. 1, and the first VRM 231 provides the power to the first processing unit 210 and the second VRM 232 provides the power to the second processing unit 220.

The switches 241-244 are electrically connected between the power supply apparatus 230 and the processing units 210, 220. As shown in FIG. 2, the switch 241 is electrically connected with the first VRM 231 and the first processing unit 210 to control the power supply route between the first VRM 231 and the first processing unit 210. The switch 243 is electrically connected with the second VRM 232 and the first processing unit 210 to control another power supply route between the second VRM 232 and the first processing unit 210. As same as the switches 241, 243, the switches 242, 244 are electrically connected with the power supply apparatus 230 and the second processing unit 220 to control the two power supply routes between 230 and 220 respectively. Therefore, the power from the power supply apparatus 230 can be inputted to the processing units 210, 220 via the power supply routes controlled by the switches 241-244.

The control unit 250 is electrically connected to the processing units 210, 220, the clock generator 260, and the switches 241-244, so that the control unit 250 can adjust the power provided to the processing units 210, 220 from the power supply apparatus 230 by controlling the switches 241-244 and also can adjust the clock provided to the processing units 210, 220 by controlling the clock generator 260.

The control unit 250 of the embodiment can control the 241-244 according to the load of each processing unit 210, 220 to dynamic adjust the supply power and the clock of each processing unit 210, 220. Wherein, the control unit 250 detects the load of the processing units 210, 220 by hardware or software monitor means to obtain a plurality of corresponding detected results. More details are described below.

In the embodiment, it is taken into account that the control unit 250 can control the clock generator 260 to produce the external clocks of the processing units 210, 220 via an Inter-integrated Circuit (I2C) bus. In other embodiments, the control unit 250 can control the external clock provided by the clock generator 260 via other interfaces.

In the embodiment, the switches 241-244 can be Metallic Oxide Silicon Field Effect Transistor (MOSFET) Q1-Q4. In other embodiments, the switches 241-244 also can be Bipolar Junction Transistor (BJT), or other electrical switches controlled by voltage or current. It is well known that use the transistor for the switch circuit and no more details will be described herein.

In the embodiment, the control unit 250 is the south bridge chipset which can control operation of the first processing unit 210, the second processing unit 220, the switches 241-244, and the clock generator 260. In other embodiments, the control unit 250 also can be super IO chip or other equivalent chipset.

Compare to the current technology, although at the initial setting, the VRMs 231, 232 provide the power to the processing units 210, 220 individually, the VRM 231 still can supply power to the second processing unit 220 and the VRM 232 also can supply the first processing unit 210 by the switches 241-244. That is, the control unit 250 can control the power supply routes from the VRMs 231, 232 to the processing units 210, 220 by controlling the switches 241-244.

For example, the control unit 250 can turn on the switch 243 and turn off the switch 244, and only permit the second VRM 232 provides the power to the first processing unit 210. Similarly, the control unit 250 can turn off the switch 243 and turn on the switch 244, and only permit the second VRM 232 provides the power to the second processing unit 220. The control unit 250 can also turn on both the switch 243 and the switch 244, and permit the second VRM 232 provides the power to the first processing unit 210 and the second processing unit 220 at the same time. In addition, the control unit 250 can control the switches 241, 242 to manage the power supply route from the first VRM 231 to the first processing unit 210 and/or the second processing unit 220.

Therefore, if the load concentrates in the first processing unit 210, the control unit 250 can control the switches 241-244 according to this situation appropriately to transfer a part of the output power of the VRM 232 which corresponding to the second processing unit 220 with low load to the first processing unit 210. In another word, the VRMs 231, 232 can provide power to the first processing unit 210 simultaneously to ensure the first power processing unit 210 receives enough power to operate in higher speed.

Since the load current increasing with the load of the processing unit, a hardware monitor means is used in the embodiment of the invention to detect the load of the processing units 210, 220 for the control unit 250 to adjust the efficiency of the multi-processor system. In the embodiment, the hardware monitor means can be performed by the detecting unit 270.

The detecting unit 270 electrically connects to the power input end of the processing units 210, 220 and the control unit 250 to detect the load voltage or current of the processing units 210, 220, so that the control unit 250 can determine the load of the processing units 210, 220. The detecting unit 270 can be implemented by the working module of Pulse Width Modulation Controllers (PWM Controller) of the plurality of VRMs 231, 232 or by a comparator circuit realized via an operational amplifier and a plurality of precision resistance. For example, the multi-processor system 200 can detect the current of the load by the periodic signal of the PWM controller or the comparator circuit with impedance components, and output the detected results to the control unit 250 to perform the monitor of the CPU utilization by hardware monitor method.

Besides, the present operation system which installed on the computer usually builds in a task manager to provide the information such as the load of CPU or the CPU utilization. In addition, users may use the customized application program (AP) to get the CPU load. Therefore, in other embodiments of the invention, the multi-processor system 200 can detect the CPU load by a software monitor means. For example, the multi-processor system 200 can determine the load of the processing units 210, 220 according to the CPU using information by the operation system or the AP, and then provide proper power to the processing units 210, 220.

For example, when the utilization of the first processing unit 210 is higher than that of the second processing unit 220 and the gap exceeds a predetermined threshold, the control unit 250 can determine the load concentrated on the first processing unit 210 according to the CPU using information. The concentration may be led by the first processing unit 210 executes a application program with single thread characteristic or the second processing unit 220 waits for the operation results from the first processing unit 210. At this time, the control unit 250 can control the operation of the switches to change the initial setting of the VRMs 231, 232 and output majority of the power of the VRMs to the processing unit 210.

From above, the embodiment of the invention can detect the load of the processing units 210, 220 by hardware or software monitor means. The control unit 250 can adjust the supply power of the power supply apparatus 230 according to the load detected results of the processing units 210, 220. In one embodiment, the control unit 250 can adjust the supply power according to the differences between the load of each processing unit 210 and 220. For example, the control unit 250 adjusts the power supply ratio to the first processing unit 210 and the second processing unit 220 of second VRM 232 according to the differences between the load of the processing units 210 and 220, such as the control unit 250 controls the switches 243, 244 that used the transistor Q3 and Q4 of which the conducted current can be adjusted by the control unit 250. Therefore, more power will be transferred to the first processing unit 210, and the second processing unit 220 with low load will be provided with minimum power to keep operating.

Figure 3:
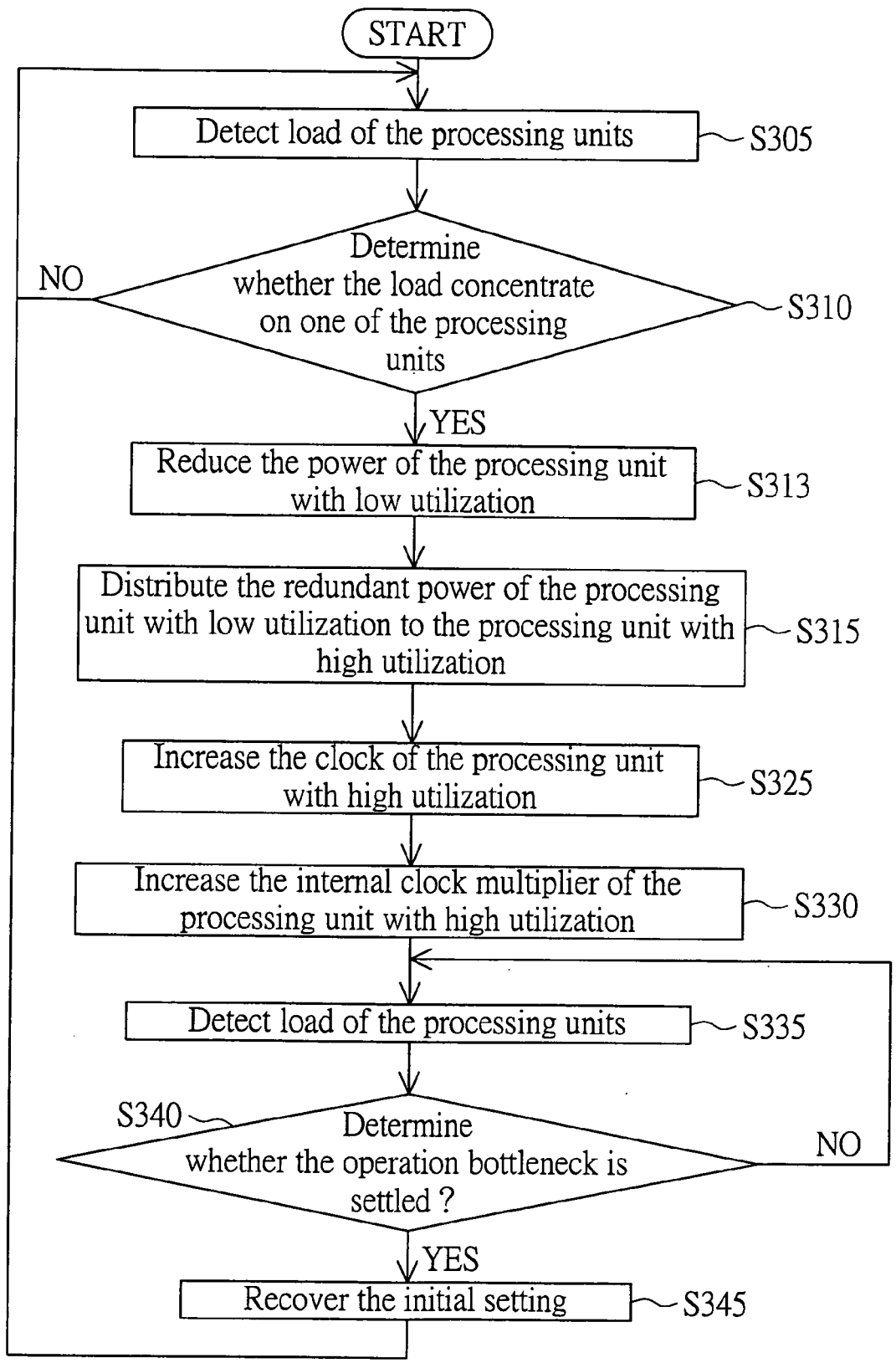
FIG. 3 is a flow chart showing the performance enhancement method of a multi-processor system according to the preferable embodiment of the invention.

Please refer to FIG. 2 and FIG. 3 for further understanding the adjusting operation of the embodiment of the invention. FIG. 3 shows the flow chart of the performance adjustment method of the multi-processor system in the embodiment of the invention. In step S305, the detect unit 270 detects the load of each processing unit 210, 220 to get at least one detecting result, and then send the detecting results to the control unit 250, wherein the detection can be performed by the hardware or software monitor means.

In step S310, the control unit 250 determines if the system load concentrated on one processing unit according to the detecting results. That is, the control unit 250 determines whether the difference between the load of the first processing unit 210 and that of the second processing unit 220 exceeds a threshold. For example, if the load of the first processing unit 210 is greater than the load of the second processing unit 220 and the difference exceeds a predetermined threshold, the control unit 250 decided the system load concentrated on the first processing unit 210. If the control unit 250 determines the load not concentrated on one processing unit, the system is in normal state, the control unit 250 kept the regular operation (the processing units 210, 220 also worked in their initial setting) and the detecting unit 270 kept detecting the load of the processing units 210, 220. When the control unit 250 decided the load concentrates on one processing unit, step S313 will be performed as follow.

In step S313, the control unit 250 can optionally combine the following steps to reduce the power consumption of the processing unit with low utilization. The steps include: changing the power state of other processing units with low utilization; controlling the processing unit with low utilization into Enhanced Intel SpeedStep Technology (EIST) mode; and choosing reduce the clock or the internal clock multiplier of the processing unit with low utilization.

For example, the power state of the processing units 210, 220 includes C0-Active mode, C1-Halt mode, C2-Stop Clock mode, C3-Deep Sleep mode, and C4-Deeper Sleep mode. In the embodiment, the range of the internal clock multiplier of the processing units 210, 220 is about from 1.5 to 20. In step S313, for example, the low utilization processing unit is the second processing unit 220. The control unit 250 can change the power state of the processing unit 220 from C0 mode to C1 mode. In other embodiments, the control unit 250 can change the power state of the processing unit 220 from C0 mode to C4 mode or other power-saving mode, and the control unit 250 also can change the internal clock multiplier of the processing unit 220 from high range to low range, such as form 12 to 8.

The control unit 250 also can use an I2C bus to reduce the clock (or the external clock) of the processing unit with low utilization. That is, the control unit 250 controls the clock generator 260 by the I2C bus to reduce the clock outputted from the clock generator 260 to the processing unit with low utilization such as the second processing unit 220. In general, the clock of the processing units 210, 220 can be 50, 60, 66.6, 75, 83.3, 95, 100, 112, 124, 133 . . . , 333 MHz and so on. In the embodiment, the clock generator 260 was providing a 124 MHz clock to the second processing unit 220, and now the control unit 250 can control the clock generator 260 to provide a 100 MHz clock to the second processing unit 220.

Next, in step S315, the control unit 250 distributes the redundant power of the processing unit with low load (low utilization) to the processing unit concentrated with load (high utilization) by controlling the switches 241-244.

Basically, the processing unit concentrated with load has priority to get maximum supply power, and the control unit 250 will control the corresponding VRMs and switches 241-244 of the other processing units with low load depending on the concentration situation, and reduce the output power to the processing units with low load. Therefore, the processing unit concentrated with load can get more power work in higher speed and reduce the concentrated time. For example, if the control unit 250 believes the load concentrated on the first processing unit 210, and then the control unit 250 controlled the switches 241-244 to provide the greater part of power from the second VRM 232 to the first processing unit 210.

In the embodiment, step S313 is sub-process for step S315. Step S313 is performed optional before executing step S315. In other embodiments, step S325 and step S330 can be chosen for performing individually or combined. FIG. 3 only shows one embodiment of the implement combination method. In other embodiments, after step S315, only step S330 can be performed, and then go to step S335. More details for step S325, S335, and the other following steps are shown below.

In step S325, the control unit 250 controls the clock generator 260 by the I2C bus to increase the clock outputted from the clock generator 260 to the processing unit with high utilization such as the first processing unit 210. For example, the clock generator 260 was providing a 124 MHz clock to the first processing unit 210, and now the control unit 250 can control the clock generator 260 to provide a 133 MHz clock to the first processing unit 210.

In step S330, the control unit 250 increases the internal clock of the processing unit with high utilization to improve the system efficiency. For example, in the embodiment, the high utilization processing unit is the first processing unit 210. The control unit 250 can change the internal clock multiplier of the processing unit 210 from low range to high range, such as form 12 to 14.

In step S335, the detecting unit 270 detects the load of each processing unit 210, 220 continually and sends the results to the control unit 250, so that the control unit 250 can determine whether the operation bottleneck is settled (step S340). If the bottleneck is not solved, then went back to step S335. If the bottleneck is solved, then went to step S345 to recover the initial setting via the control unit 250 and went to the next step S305.

In other embodiments, if the bottleneck is not solved, the control unit 250 still could determine whether the difference of the load between the processing units exceeds a threshold. If the difference is less than the predetermined threshold (that means the concentration of the load still occurs, but is better than that before adjusted), held the power supply ratio of the processing units 210, 220 after the first adjustment and went to step S335. If the difference is greater than the predetermined threshold, executed step S315 again to adjust the power supply ratio. For example, from the detected results of the detecting unit 270, the load of the first processing unit 210 is not reduced but even higher after providing majority power. Therefore, the control unit 250 further reduces the power provided to the second processing unit 220 and increases the power to the first processing unit 210 from the second VRM 232.

A multi-processor system and a performance adjustment method thereof provided on the embodiment of the invention can dynamic distribute the supply power of each processing unit of the multi-processor system, so that the processing unit with high load can perform operation in higher speed to reduce the bottleneck time.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A performance adjustment method of a multi-processor system, the multi-processor system including at least a first processing unit and a second processing unit, and a first voltage regulator module (VRM) and a second VRM for supplying power to the processing units, the performance adjustment method comprising:
   (a) at initial setting, supplying power from the first VRM to the first processing unit and supplying power from the second VRM to the second processing unit;
   (b) detecting the load of the processing units to get a plurality of corresponding detecting results;
   (c) determining whether the load concentrated on one processing unit of the processing units; and
   (d) if the load concentrated on the first processing unit, simultaneously supplying from the first VRM and the second VRM to the first processing unit with high load.

2. The performance adjustment method according to claim 1, wherein the step (d) further includes increasing a clock or internal clock multiplier of the first processing unit.

3. The performance adjustment method according to claim 2, wherein the multi-processor system further includes a control unit and a clock generator, the control unit electrically connected to the processing units and the clock generator respectively, the clock generator electrically connected to the processing units respectively, the control unit increasing the clock of the first processing unit by controlling the clock generator.

4. The performance adjustment method according to claim 3, wherein the control unit controls the clock generator by an inter integrated circuit bus.

5. The performance adjustment method according to claim 2, wherein in the step (d), an inter integrated circuit bus is used to increase the clock of the first processing unit.

6. The performance adjustment method according to claim 1, wherein the step (d) further includes reducing supply power, clock, internal clock multiplier, or power state of the second processing unit.

7. The performance adjustment method according to claim 1, wherein the step (b) uses a hardware means or a software monitor means to detect the load of the processing units.

8. A multi-processor system, comprising:
   a first processing unit and a second processing unit;

a clock generator electrically connected to the processing units respectively and providing clocks to the processing units respectively;

a power supply apparatus be used to provide power to the processing units, the power supply apparatus comprising a first VRM and a second VRM for supplying power to the processing units;

a plurality of switches electrically connected to the first VRM and the second VRM and the processing units respectively; and a control unit electrically connected to the processing units, the clock generator, and the switches respectively, so that the control unit adjusts the power provided from the first VRM and the second VRM to the processing units by controlling the switches and adjusts the clocks provided to the processing units by controlling the clock generator, wherein at initial setting, the first VRM and the second VRM respectively supply power to the first and the second processing units, and when the load concentrates on the first processing unit, the control unit controls the switches to simultaneously supply power from the first VRM and the second VRM to the first processing unit with high load.

9. The multi-processor system according to claim 8, wherein the control unit uses a hardware or a software monitor means to detect the load of the processing units to get a plurality of corresponding detected results.

10. The multi-processor system according to claim 9, wherein the hardware monitor means is implemented by a detecting unit, and the detecting unit is electrically connected to the processing units and the control unit respectively.

11. The multi-processor system according to claim 9, wherein the control unit determines the load concentrated on one processing unit of the processing units or not according to the detected results.

12. The multi-processor system according to claim 11, wherein if the load concentrated on the first processing unit, the control unit controls the clock generator to increase the clock of the first processing unit.

13. The multi-processor system according to claim 12, wherein the control units controls the clock generator by an inter integrated circuit bus.

14. The multi-processor system according to claim 11, wherein if the load concentrated on the first processing unit, the control unit increases an internal clock multiplier of the first processing unit.

15. The multi-processor system according to claim 8, wherein the switches are transistor switches.

16. The multi-processor system according to claim 8, wherein the software monitor means uses an application program or an operation system to read utilizations of the processing units.

* * * * *